(12) United States Patent
Kim

(10) Patent No.: US 7,594,132 B2
(45) Date of Patent: Sep. 22, 2009

(54) COMPUTER SYSTEM WITH POWER-SAVING CAPABILITY AND METHOD FOR IMPLEMENTING POWER-SAVING MODE IN COMPUTER SYSTEM

(75) Inventor: Yang Hoon Kim, Seongnam (KR)

(73) Assignee: LG Electronics Inc., Seoul (KR)

( * ) Notice: Subject to any disclaimer, the term of this patent is extended or adjusted under 35 U.S.C. 154(b) by 409 days.

(21) Appl. No.: 11/382,873

(22) Filed: May 11, 2006

(65) Prior Publication Data

US 2006/0265610 A1    Nov. 23, 2006

(30) Foreign Application Priority Data

May 18, 2005 (KR) ............... 2005/0041808
Jun. 1, 2005 (KR) ............... 2005/0046926

(51) Int. Cl.
*G06F 1/00* (2006.01)
(52) U.S. Cl. ............... 713/322; 713/300; 713/320
(58) Field of Classification Search .......... 713/300, 713/320, 322
See application file for complete search history.

(56) References Cited

U.S. PATENT DOCUMENTS

| | | | |
|---|---|---|---|
| 6,457,135 B1* | 9/2002 | Cooper | 713/323 |
| 6,966,007 B2* | 11/2005 | Kuo et al. | 713/320 |
| 7,010,704 B2* | 3/2006 | Yang et al. | 713/300 |
| 7,076,674 B2* | 7/2006 | Cervantes | 713/310 |
| 7,281,140 B2* | 10/2007 | Burns et al. | 713/300 |
| 7,353,133 B2* | 4/2008 | Park | 702/130 |
| 2001/0003206 A1* | 6/2001 | Pole et al. | 713/320 |
| 2003/0126478 A1* | 7/2003 | Burns et al. | 713/300 |
| 2004/0006719 A1* | 1/2004 | Kuo et al. | 713/300 |
| 2004/0168096 A1* | 8/2004 | Yeh | 713/300 |
| 2004/0225902 A1* | 11/2004 | Cesare et al. | 713/300 |
| 2006/0174146 A1* | 8/2006 | Prosperi et al. | 713/320 |

* cited by examiner

*Primary Examiner*—Thomas Lee
*Assistant Examiner*—Jaweed A Abbaszadeh
(74) *Attorney, Agent, or Firm*—Fish & Richardson P.C.

(57) ABSTRACT

A computer system includes an operating system, a CPU operatively connected with the operating system, and a power management unit for adjusting throttling duty to regulate CPU speed according to a power management mode of the CPU, wherein the power management unit is configured for determining the power management mode. The throttling duty can be adjusted based upon a thermal mode of the CPU, for example, based on the system temperature or the residual capacity of a battery.

24 Claims, 7 Drawing Sheets

COMPUTER SYSTEM WITH POWER-SAVING CAPABILITY AND METHOD FOR IMPLEMENTING POWER-SAVING MODE IN COMPUTER SYSTEM

CROSS-REFERENCE TO RELATED APPLICATIONS

This application claims priority under 35 U.S.C. §119 to Korean Patent Applications Nos. 10-2005-0041808 and 10-2005-0046926 filed with the Korean Industrial Property Office on May 18, 2005 and Jun. 1, 2005, respectively. Each of these applications is incorporated by reference.

BACKGROUND

This description relates to a computer system and a method for implementing a power-saving mode in a computer system to reduce power consumption by adjusting the speed of a CPU according to a CPU power management mode of the computer system.

Portable computer systems, such as, for example, a laptop or notebook computer, are universally used because of excellent portability and mobility. As new types of mobile services appear, such as mobile Internet service, and digital multimedia broadcasting (DMB) service, it is expected that demand for portable computers will increase more rapidly. As the available services for portable computers become more diversified and entertainment content rapidly increases, the frequency and time spent using portable computers accordingly increase. Therefore, recent research and development efforts have been directed at technologies for reducing power consumption of portable computers.

One conventional technology is a method in which power consumption is minimized by turning off the power of unused devices according to the selection of a user. In this system, a user manages the power consumption in a computer system having a main board on which devices are packaged by turning off power to the unused devices.

In another method for reducing power consumption of a computer system, the activity of a computer system is checked, and a processor is paused if there is no system activity after a certain period of time. The paused processor runs again in response to the request of a user.

INTEL SPEEDSTEP® technology is a conventional processor-related technology with low power consumption. Power-saving capability of INTEL SPEEDSTEP® provides four modes supported by a CPU, so as to enable a user to select a CPU mode suitable to his/her environment. The processor voltage and a core frequency are dynamically adjusted according to the respective modes, thus reducing power consumption.

The CPU supporting the INTEL SPEEDSTEP® has specific registers. One of them is a register (IA32_PERT_STS) for storing the current CPU voltage, the status of a bus ratio, and maximum and minimum supportable values of a bus ratio. Another register is a register for setting the current CPU voltage and the bus ratio. An Operating System (OS) changes the settings of such a register and, in the end, actively adjusts CPU speed according to the user's setup. In this way, a power-saving effect is achieved.

When the user changes the CPU mode, the operating system effectively adjusts the CPU speed according to the load of the CPU through the register. For example, if the user sets the CPU mode to an optimal battery mode or a full battery mode of the CPU, the operating system fixes the full CPU speed, for example, to 800 MHz, and further lowers the CPU speed according to a system state through the above-mentioned register.

However, in the case of a computer having a CPU which does not provide the power-saving capability of the INTEL SPEEDSTEP® hardware, various CPU power management modes may still be supported. For example, in such a CPU, the CPU speed may not be changed in response to a power-saving mode, for example, even if a power-saving mode such as an optimal battery mode or a full battery mode of the CPU is selected. In this case, only power supplied to the CPU and other connected devices, such as a hard disk, an LCD and so forth, are adjusted.

Relatively lower price computers do not currently support the above-mentioned IA32_PERT_STS register, and do not support the INTEL SPEEDSTEP® capability. Accordingly, substantial power-saving effects cannot be obtained in these lower priced computers because CPU speed is not lowered in response to a user selecting a power-saving CPU mode, such as an optimal battery mode or a full battery mode of the CPU.

SUMMARY

A computer system with power-saving capability can reduce power consumption by adjusting CPU speed according to a CPU power management mode of the computer system. The system also can reduce power consumption by adjusting CPU speed according to system temperature in a power-saving mode of the CPU.

A computer system with power-saving capability also can implement a low-speed power-saving mode by reducing the speed of a CPU that does not support INTEL SPEEDSTEP® capability, when a user sets a CPU power management mode to a power-saving mode, such as an optimal battery mode or a full battery mode.

In one general aspect, a computer system includes an operating system, a CPU operatively connected with the operating system, and a power management unit for adjusting throttling duty to regulate CPU speed according to a power management mode of the CPU, wherein the power management unit is configured for determining the power management mode.

Implementations may include one or more of the following features.

The power management mode of the CPU may include at least one mode selected from the group consisting of a full performance mode, an optimal battery mode, a full battery mode and an automatic mode.

The power management unit may adjust the throttling duty to achieve a full CPU speed in the full performance mode.

The power management unit may adjust the throttling duty to a predetermined value in the optimal battery mode.

The power management unit may adjust the throttling duty in proportion to a battery residual capacity in the full battery mode.

The power management unit may adjust the throttling duty to a predetermined value according to system temperature in the optimal battery mode or the full battery mode.

The power management unit may reference a CPU occupancy rate and adjust the throttling duty in relation to the CPU occupancy rate in the automatic mode.

The power management unit may include a microcomputer and a power control unit.

The power management unit may be operatively connected to the operating system, the CPU and a system chip.

In another general aspect, a computer system includes a CPU, and a power management unit for regulating CPU speed by adjusting throttling duty of the CPU according to a CPU power management mode, wherein the power management unit is configured for determining the CPU power management mode.

Implementations may include one or more of the following features.

The power management unit may include a mode information readout section for reading out information on the CPU power management mode and battery residual capacity from an operating system of the computer system, and a throttling duty adjustment section for adjusting the throttling duty of the CPU according to the CPU power management mode.

The throttling duty adjustment section may adjust the throttling duty to 0% when the CPU power management mode is set to a full performance mode.

The throttling duty adjustment section may set the throttling duty to a single value less than approximately 50% when the CPU power management mode is set to an optimal battery mode.

The throttling duty adjustment section may set the throttling duty in proportion to the battery residual capacity when the CPU power management mode is set to a full battery mode.

The throttling duty adjustment section may regulate the CPU speed by adjusting the throttling duty according to a CPU occupancy rate when the CPU management mode is set to an automatic mode.

The throttling duty adjustment section may adjust the throttling duty downward by one grade-step when the CPU power management mode is set to the full battery mode and the CPU is an overused state, maintain the throttling duty intact when the CPU is in moderate use state, and adjust the throttling duty upward by one grade-step when the CPU is in an underused state.

In another general aspect, a computer system includes an operating system, a CPU having a thermal sensing circuit for sensing a current system temperature, and a microcomputer for acquiring information on a current power-saving mode of the CPU from the operating system of the computer system, and for performing CPU throttling according to a higher temperature between a value obtained by converting power-saving mode information into temperature and the current system temperature when the CPU power management mode is set to the power-saving mode.

Implementations may include one or more of the following features.

The microcomputer may perform the CPU throttling when the CPU power management mode is set to an optimal battery mode or a full battery mode.

In another general aspect, a method for implementing a power-saving mode in a computer system includes determining a CPU power management mode of the CPU, and adjusting the CPU speed if the CPU power management mode is in the power-saving mode by adjusting throttling duty of the CPU.

Implementations may include one or more of the following features.

Determining the CPU power management mode may include determining if the CPU has a CPU speed adjusting function, and determining a CPU power management mode if the CPU does not have the CPU speed adjusting function.

The throttling duty of the system chip may be adjusted to to 0% when the CPU power management mode is set to an optimal battery mode.

The throttling duty may be set to a single value less than 50% when the CPU power management mode is set to a full performance battery mode.

The battery residual capacity may be checked and the throttling duty may be adjusted in proportion to the battery residual capacity when the CPU power management mode is set to a full battery mode.

A CPU occupancy rate may be checked and the throttling duty adjusted according to the CPU occupancy rate such that the CPU operates at a speed proportional to load imposed on the system.

If the CPU power management mode is set to the power-saving mode and the power-saving mode is the full battery mode, the throttling duty may be lowered if the CPU is being overused in view of the CPU occupancy rate, the throttling duty may be maintained if the CPU is being moderately used, and the throttling duty may be raised if the CPU is being underused.

In another general aspect, a method for implementing a power-saving mode in a computer system includes determining if a CPU power management mode is set to the power-saving mode, converting the power-saving mode into temperature when the CPU power management mode is set to the power-saving mode, measuring current system temperature when the CPU power management mode is set to the power-saving mode, and performing CPU throttling according to higher temperature between a value obtained by converting the power-saving mode of the CPU into temperature and the measured current system temperature.

Implementations may include one or more of the following features.

Determining the CPU power management mode may include determining the CPU power management mode as the power-saving mode when the CPU power management mode is set to a full battery mode or an optimal battery mode.

If the CPU power management mode is not set to the power-saving mode, the CPU throttling is not performed.

In another general aspect, a corrputer-readable recording medium in which corrputer-executable program codes are stored, the program codes being configured to cause a computer to perform a method for implementing a power-saving-mode in a computer system, the method including determining whether a CPU has a function of adjusting CPU speed according to a power management mode, reading out information on the CPU power management mode if the CPU is determined as not having the function, setting throttling duty of a system chip to a single value less than 50% when the CPU power management mode is set to an optimal battery mode, and checking battery residual capacity and adjusting the throttling duty of the system chip in proportion to the check battery residual capacity when the CPU management mode is set to a full battery mode.

Other features and advantages will be apparent from the following description, including the drawings, and the claims.

DETAILED DESCRIPTION

Figure 1:
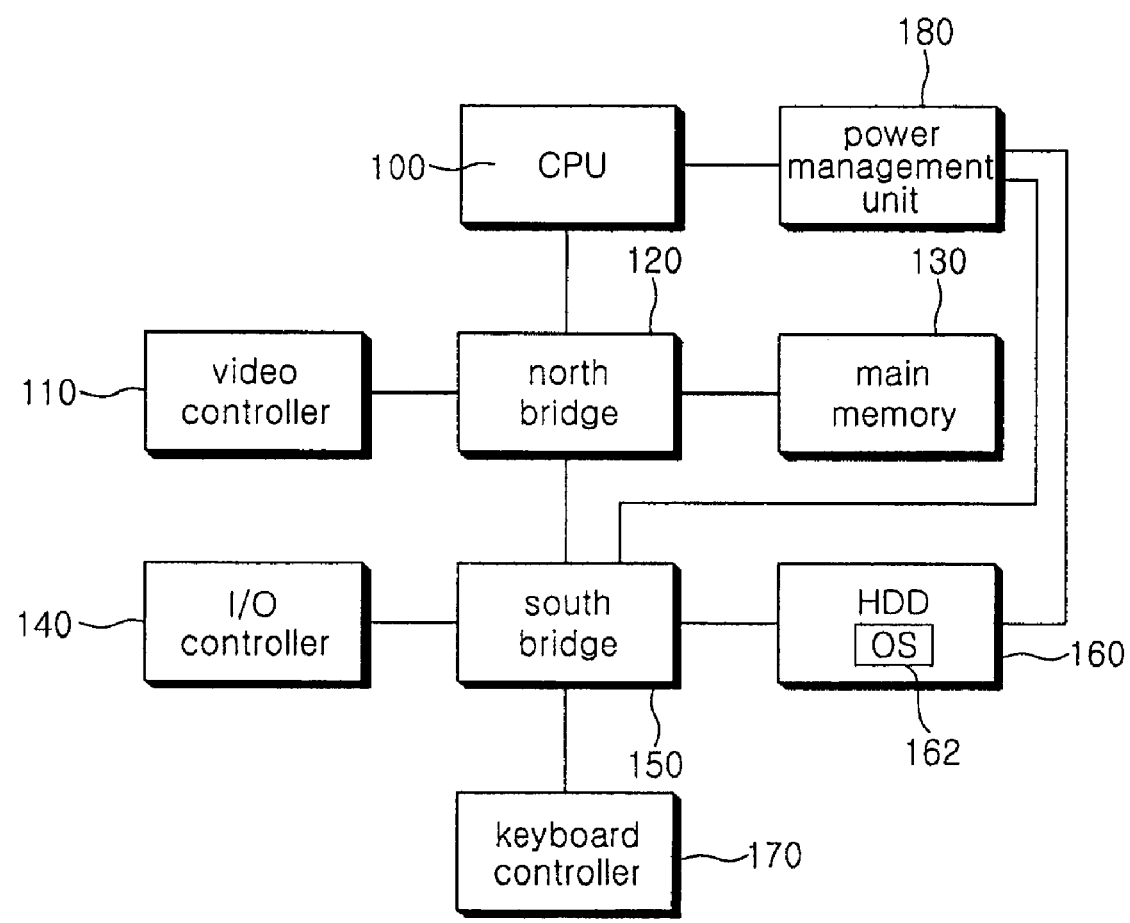
FIG. 1 is a functional block diagram of a computer system with power-saving capability.

In the following description and drawings, the same reference numerals are used to designate the same or similar components, so repetition of the description on the same or similar components will be omitted.

The term "power-saving mode" in this specification refers to a power management mode in which CPU speed does not exceed half the maximum possible operating speed of the CPU. Although the power-saving modes may take different names according to manufacturers of processors, it is generally called, for example, an optimal battery mode or a full battery mode.

The term "CPU throttling" in this specification refers to a process of adjusting the clock frequency and the operation voltage of a CPU according to a thermal mode based on thermal temperature or battery residual capacity, in particular, a process of reducing operating speed of the CPU by lowering the frequency and the operating voltage of the CPU, for example, when the system temperature exceeds a predetermined threshold.

A computer system with power-saving capability includes a function for slowing down CPU speed when full performance is not required. The computer system includes a power management unit capable of changing throttling duty of a system chip in order to regulate the CPU speed according to a CPU power management mode. In a power-saving mode in which it is desired to prolong the use time of a battery at the cost of low CPU speed, the power management unit adjusts the throttling duty such that the CPU speed is lowered, thereby reducing power consumption.

Referring to FIG. 1, the computer system includes a CPU 100, a video controller 110, a main memory 130, a north bridge 120 for controlling the main memory 130, an I/O controller 140, a south bridge 150 which is an aggregate of registers for managing input/output functions of peripherals, a hard disk (HDD) 160, a keyboard controller 170 and a power management unit 180.

The CPU 100 controls and manages the overall computer system, and executes operations and logical manipulations. Hardware elements for executing these operations and logical manipulations within the CPU 100 include an arithmetic logical unit (ALU), a control unit (CU), a register and the like.

The video controller 110 controls data to be output to a display device such as a CRT or an LCD. The video controller 110 and the north bridge 120 can be connected to each other by means of an accelerated graphic port (AGP).

The north bridge 120 controls devices operating at a relatively high speed, such as the CPU 100, the main memory 130, the video controller and so forth. A memory controller, a host bridge, an AGP controller, and similar elements are under the direct control of the north bridge 120. The north bridge 120 and the south bridge 150 are connected to each other via a PCI bus.

The south bridge 150, an aggregate of registers for managing input/output functions of peripherals, controls devices operating at a relatively low speed, such as the HDD 160, a keyboard, a mouse and the like. The south bridge 150 controls data streams of the peripherals such as a PCI, an IDE and a USB data stream, or takes charge of power management.

The I/O controller 140 controls data input/output between the computer and the peripherals. The main memory 130 creates workspaces such that various programs can be smoothly driven.

The HDD 160 stores a variety of programs including an operating system (OS) 162. However, various application programs as well as system programs such as the operating system may be stored in a separate memory called a read only memory (RCM). In addition, the operating system stored in the HDD 160 is uploaded to a random access memory (RAM) of the memory and then is executed through a system booting operation.

The power management unit 180 regulates the speed of the CPU 100 by adjusting throttling duty of a system chip according to a power management mode of the CPU 100. The power management unit 180 operates in connection with the operating system, the CPU 100 and the system chip (to be specific, the south bridge).

In addition to the above-mentioned components, the computer system may further include a PCL wireless LAN for accessing the Internet wirelessly, a wired LAN/modem responsible for networking functions, and USB terminals enabling the use of various peripherals including a mouse, an external HDD case and a flash memory reader.

Figure 2:
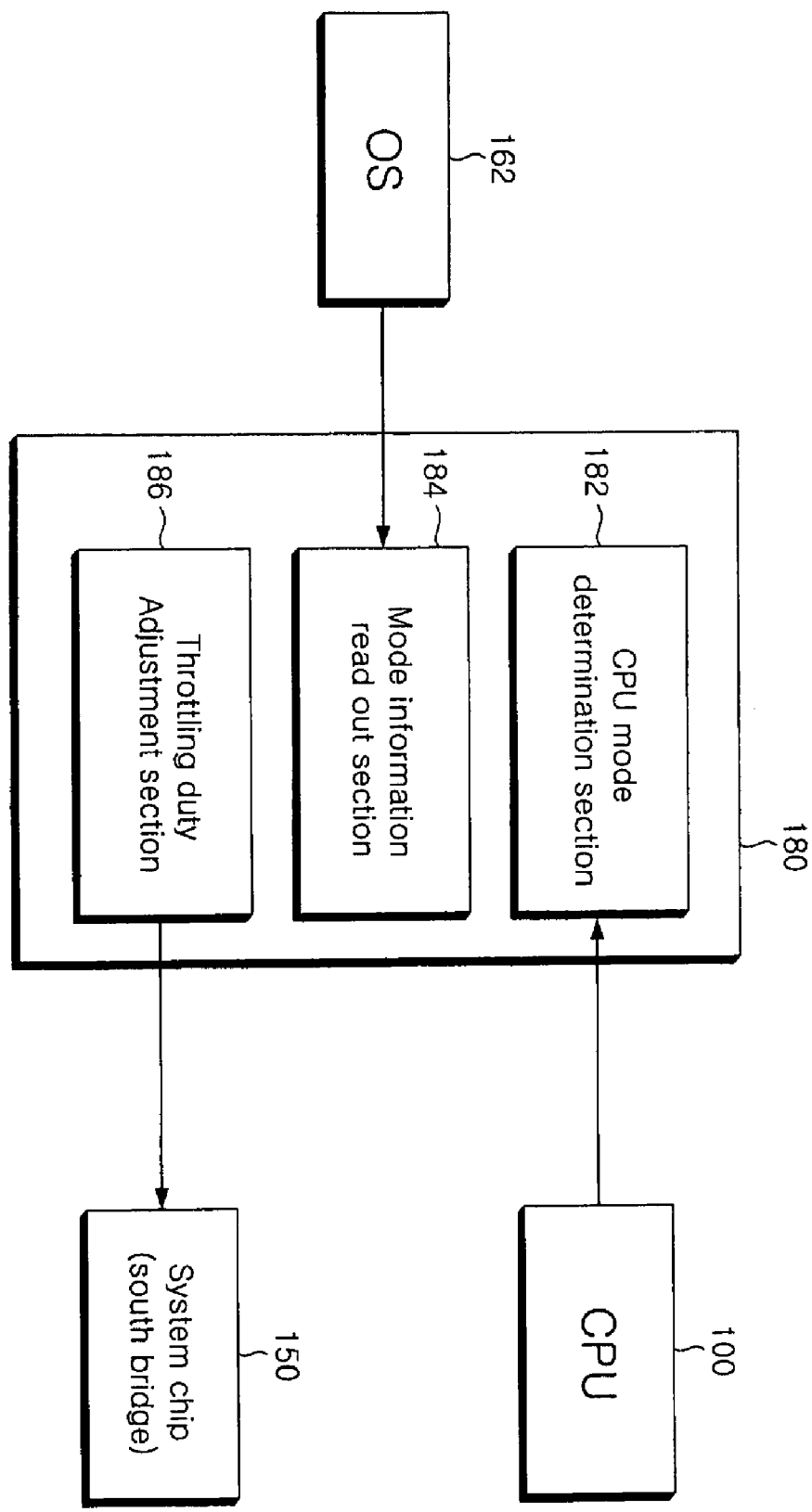
FIG. 2 is a detailed block diagram of a power management unit included in the computer system shown in FIG. 1.

FIG. 2 illustrates a detailed block diagram of the power management unit of the computer system in FIG. 1.

Referring to FIG. 2, the power management unit 180 includes a CPU mode decision section 182 for determining whether the CPU 100 provides a speed deceleration function of lowering CPU speed, a mode information readout section 184 for reading out information on a CPU power management mode and battery residual capacity from the operating system 162, and a throttling duty adjustment section 186 for adjusting the throttling duty of the south bridge 150 according to each CPU mode.

The CPU mode decision section 182 determines the type of the CPU 100 in such a manner that the section 182 determines whether the CPU 100 provides a power-saving function such as a INTEL SPEEDSTEP® function (i.e., a function of adjusting CPU speed according to CPU modes). If the CPU 100 provides the INTEL SPEEDSTEP® function, no further operation is performed.

In contrast, when the CPU 100 is determined not to provide the function of lowering CPU speed, the mode information readout section 184 receives information on a CPU mode from the operating system 162. A user can input the information on a CPU mode through a user interface of the computer system. For example, when a user uses the computer system in a situation where he/she cannot connect the computer to an AC power source, he/she can select a power-saving mode (for example, an optimal battery mode or a full battery mode) in order to prolong the use time of a battery. The selection of the CPU mode can be carried out in a BIOS setup process.

If a user changes the current mode of the CPU 100, the mode readout section 184 understands this change as an event of the OS 162. In general, the power management mode of the CPU 100 supports four modes: a full performance mode, an automatic mode, an optimal battery mode and a full battery mode. This classification of the power management mode is not absolute, but may vary with computer manufacturers and configurations.

The power management mode of the CPU 100 may be automatically managed through a power management program of the computer system or may be manually operated by a user. For example, the power management program of the computer system may be configured such that the computer is automatically switched to the power-saving mode when the lowering of the battery power level is sensed. In order to manually switch the computer to the power-saving mode, options for a power management mode supported in a specific hardware configuration may be adjusted using a power option menu in the control panel of the computer. If a user manually changes the CPU mode, the power management unit section understands this as an event of the OS, and adjusts CPU speed as discussed below.

The throttling duty adjustment section 186 adjusts throttling duty of a system chip (south bridge 150) according to mode information obtained by the mode information readout section 184. If the throttling duty of the system chip is adjusted, the speed of the CPU 100 is regulated accordingly.

In the full performance mode, it is common that the CPU 100 continuously operates at its full speed. Such a state corresponds to a state where various units of the computer are supplied with as much power as possible.

In the automatic mode, the CPU 100 operates at a speed proportional to the load imposed on the system. Thus, the CPU 100 operates at a speed equal to or less than the full speed. The full battery mode may be selected when work requiring only CPU processes of the lowest level is being performed or when lowering of processing speed is tolerated for the sake of saving battery power.

In the full battery mode, the CPU 100 operates at a speed equal to or less than half the full speed according to battery residual capacity.

In this specification, the throttling duty of the CPU 100 means CPU operating speed per unit time. For example, when the CPU operates at a speed corresponding to ⅛, ¼, ⅜, ½, ⅝, ¾, ⅞, or ⅝ of the full speed per unit time, a chipset of the south bridge 150 supports CPU throttling duties of 12.5% to 87.5% at an interval of 12.5%.

Accordingly, the speed of the CPU 100 is reduced by the throttling duty with respect to the original full speed. The new speed of the CPU 100 (S') is calculated by multiplying the full speed of the CPU 100 (Smax) by 100%—throttling duty (TD) as in the following Equation (1):

$$S'=S_{max}\times(100\%-TD) \quad (1)$$

As expressed by Equation (1), the operating speed of the CPU is inversely proportional to the throttling duty of the CPU 100. A higher throttling duty will result in a lower power consumption. For example, assuming that the throttling duty is 50%, a CPU having a full speed of 1 GHz operates at a speed of 0.5 GHz. Similarly, if the throttling duty is 25%, the CPU operates at a speed of 0.75 GHz. Rather than adjusting a register of the CPU 100, throttling duty of a system chip, such as south bridge 150, is adjusted so as to lower CPU speed. In this way, power-saving capability can be implemented.

When the power management mode of the CPU 100 is set to the full performance mode, the throttling duty of the CPU 100 is fixed to 0%. If the throttling duty is 0%, the CPU speed S' becomes the full speed (Smax) of the CPU 100.

When the power management mode of the CPU 100 is set to the optimal battery mode, the throttling duty of the CPU 100 is fixed to a constant value, preferably to a single value not exceeding 50% (for example, 50%).

When the power management mode of the CPU 100 is set to the full battery mode, the throttling duty increase in proportion to battery residual capacity. For example, the throttling duty of the system chip may be adjusted to about 50% if the battery residual capacity is 100% to 20%, and the throttling duty of the system chip may be adjusted to about 75% if the battery residual capacity is less than 20%. The operating system 162 of the computer system monitors the battery to inform a user of the battery residual capacity.

When the power management mode of the CPU 10 is set to the automatic mode, the throttling duty adjustment section 186 estimates the amount of use of the CPU 100 in terms of a CPU occupancy rate, and divides the amount of use of the CPU 100 into three grades: overuse, moderate use, and underuse. When the CPU occupancy rate exceeds 80%, the amount of use of the CPU 100 can be defined as the grade of overuse. In a similar way, the amount of use of the CPU 100 can be defined as the grade of moderate use when the CPU occupancy rate is 50% to 80%, and can be defined as the grade of underuse when the CPU occupancy rate is less than 50%.

The CPU speed may be regulated stepwise by 12.5%. For example, assuming that the CPU speed is regulated in 5 steps, the CPU speed may be regulated to the full speed, 87.5% of the full speed, 75% of the full speed, 62.5% of the full speed and 50% of the full speed.

When the power management mode of the CPU 100 is set to the automatic mode, the CPU occupancy rate is periodically checked. If the CPU occupancy rate corresponds to the grade of moderate use, the current mode is maintained. However, in the case of the grade of overuse, the throttling duty is adjusted downward so as to increase the CPU speed by one grade-step from that in the current mode. For example, if the CPU occupancy rate proves to correspond to the grade of overuse when the CPU 100 is operating at a speed of 75%, the CPU speed may be upgraded to 87.5% by adjusting the throttling duty of the system chip.

If the amount of use of the CPU 100 is estimated as the grade of underuse, the throttling duty is so changed as to decrease the CPU speed by one grade-step from the current CPU speed. For example, if the CPU occupancy rate proves to correspond to the grade of underuse when the CPU 100 is operating at a speed of 62.5%, the CPU speed may be downgraded to 50% by adjusting the throttling duty of the system chip.

Figure 3:
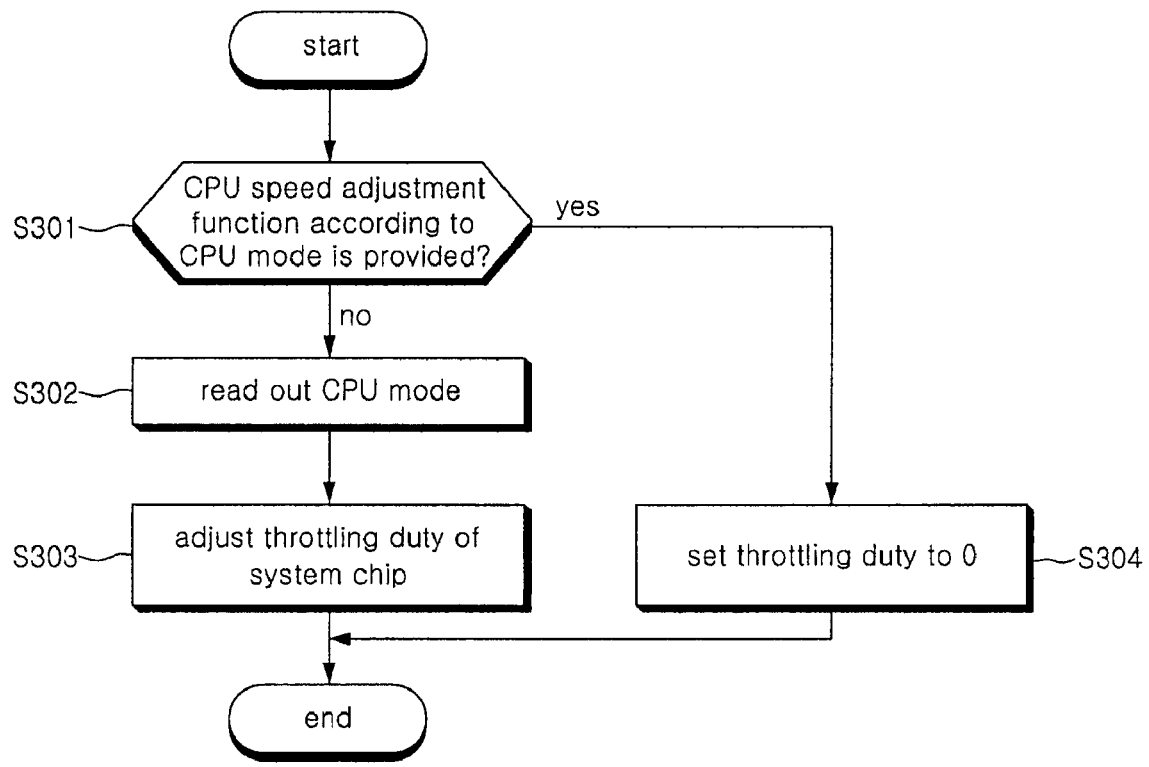
FIG. 3 is a step-by-step flowchart for explaining a method for implementing a power-saving mode in a computer system.

Referring to FIG. 3, in the method for implementing a power-saving mode in a computer system, whether a CPU 100 has a function of adjusting the speed of the CPU 100 according to a power management mode is first determined (S301). If the CPU provides power-saving capability such as a INTEL SPEEDSTEP® function, no further step is performed, and throttling duty of the computer is set to 0% (S304) and no further step is performed. The CPU can operate at normal speed because the throttling duty is 0%.

However, when the CPU 100 of the computer system does not provide a CPU speed adjustment function, information on the power management mode of the CPU is acquired (S302). The information on the power management mode can be acquired from an operating system 162 of the computer system.

The power management mode of the CPU 100 may be automatically changed or may be changed by the selection of a user. In order to adjust the throttling duty of a system chip (for example, south bridge 150) according to the power management mode of the CPU 100, the CPU power management mode information must be acquired. In particular to find out which of a full performance mode, an optimal battery mode, a full battery mode and an automatic mode is set as the CPU power management mode, the CPU power management mode information is read out from the operating system 162.

Subsequently, the throttling duty of the system chip (i.e., south bridge 150) is adjusted (S303).

Figure 4:
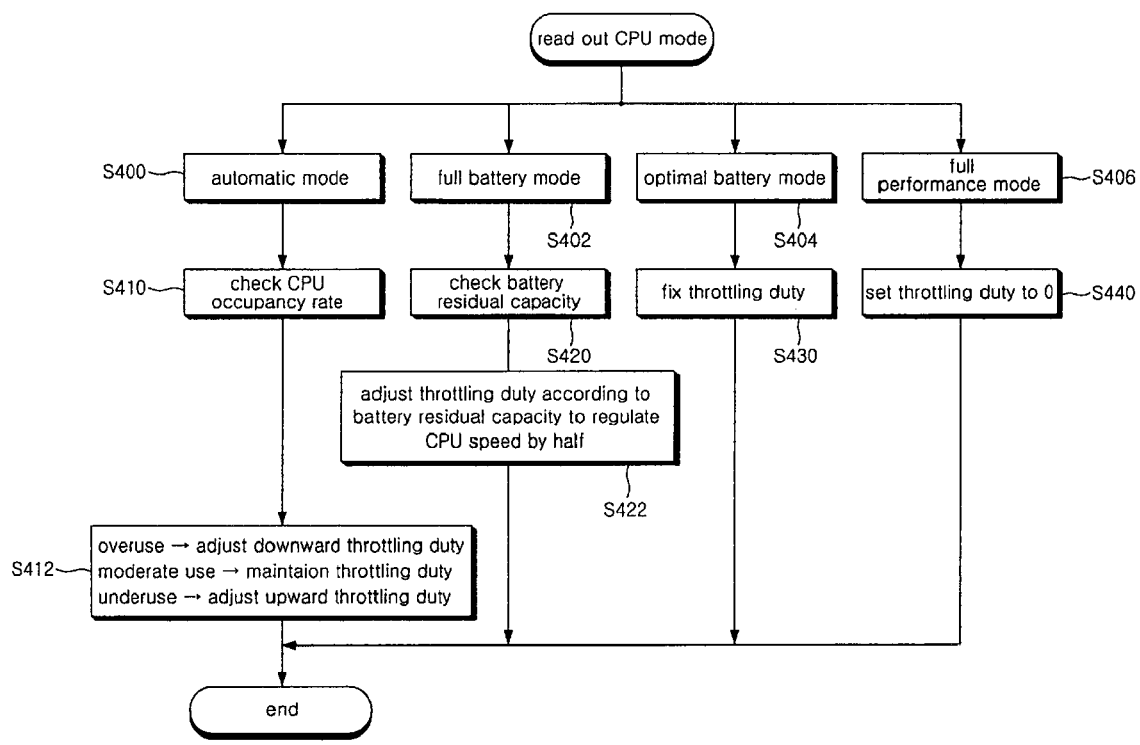
FIG. 4 is a flowchart for explaining in detail a process of adjusting throttling duty of a system chip as shown in FIG. 3.

FIG. 4 illustrates a flowchart for explaining in detail the process of adjusting the throttling duty of the system chip as shown in FIG. 3. Although the CPU power management mode is not limited to the above-mentioned 4 modes, these 4 modes are described herein by way of example for the convenience of explanation.

First, it is determined which of the automatic mode, the full battery mode, the optimal battery mode and the full performance mode is indicated by the CPU power management mode acquired from the operating system 162 (S400 to S404).

When the CPU power management mode is set to the full performance mode, the throttling duty of the system chip is set to 0% to operate the CPU at the full speed (S440).

When the CPU power management mode is set to the optimal battery mode, the throttling duty of the system chip is set to a fixed value, preferably to a single value less than 50% (S430).

When the CPU power management mode is set to the full battery mode, battery residual capacity is checked (S420), and the throttling duty of the system chip is adjusted in proportion to the checked battery residual capacity to lower CPU speed to less than half of its current value (S422). A criterion for adjusting the throttling duty of the system chip according to the battery residual capacity may be arbitrarily determined. For example, if a battery residual capacity of 20% is set as the criterion for the adjustment, the throttling duty of the system chip may be adjusted to 75% when the battery residual capacity is less than 20%, and the throttling duty of the system chip may be adjusted to 50% when the battery residual capacity is equal to or greater than 20%.

When the CPU power management mode is set to the automatic mode, a CPU occupancy rate is checked (S410), and the throttling duty of the system chip is adjusted such that the CPU operates at a speed proportional to the load imposed on the system (S412).

If the amount of use of the CPU corresponds to the grade of moderate use, the throttling duty is kept as it is. If the CPU is overused (for example, when the CPU occupancy rate is equal to or greater than 80%), the throttling duty of the system chip is adjusted downward by one grade-step from that in the current mode to increase the CPU speed. On the contrary, if the amount of use of the CPU corresponds to the grade of underuse (for example, when the CPU occupancy rate is less than 50%), the throttling duty is adjusted upward by one grade-step from that in the current mode to decrease the CPU speed.

In another general aspect, a corrputer-readable recording medium stores computer-executable program codes that cause a computer to perform a method for implementing a power-saving-mode in a computer system. The method includes the steps of determining whether a CPU has a function of adjusting CPU speed according to a power management mode, reading out information on the CPU power management mode if the CPU is determined as not having the function, setting throttling duty of a system chip to less than 50% when the CPU power management mode is set to an optimal battery mode, and checking battery residual capacity and adjusting the throttling duty of the system chip in proportion to the battery residual capacity when the CPU management mode is set to a full battery mode.

The corrputer-readable medium includes all kinds of record devices in which data readable by a computer system are stored. For example, the corrputer-readable medium may be a ROM, an EEPROM, a flash EEROM, a floppy disk, a CD-ROM, an optical data storage device and so forth.

When a program for implementing the method is stored in a ROM, the program may be recorded in the ROM during a semiconductor manufacturing process. When the program is stored in a separate storage medium or is downloaded through a network, it may be newly installed in the computer while the existing program is deleted or may update the existing program in the computer system.

Figure 5:
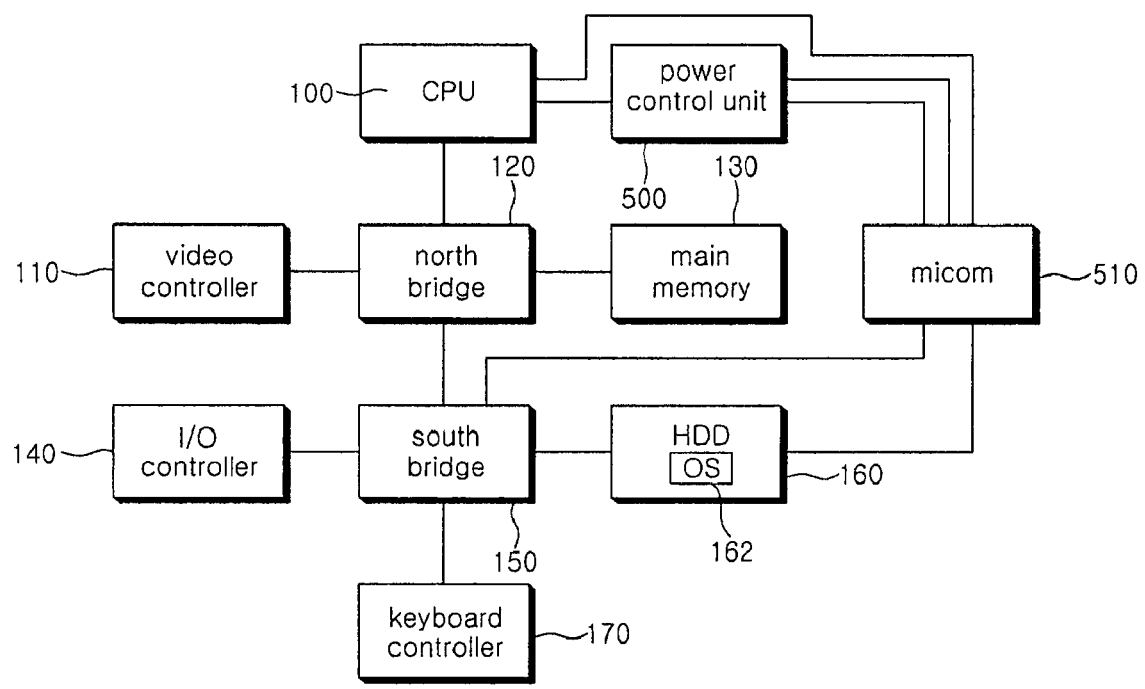
FIG. 5 is a functional block diagram of a computer system with power-saving capability.

Referring to FIG. 5, the computer system shown in FIG. 5 has the same general structure as that of the computer system shown in FIG. 1, except that, instead of the power management unit 180 in FIG. 1, the computer system includes a microcomputer 510 (hereinafter referred to as "micom") connected between the CPU 100, the south bridge 150 and the HDD 160, and a power control unit 500 connected between the micom 510 and the CPU 100. In FIG. 5, components having the same function and working effect as those of components in FIG. 1 are designated by the same reference numerals as those used in FIG. 1. In addition, repetition of the description on these same components in FIGS. 1 and 5 will be omitted because they have been already fully explained in conjunction with FIG. 1.

In the system of FIG. 5, the power control unit 500 operates in connection with an operating system 162, a CPU, a system chip (to be specific, south bridge 150) and the micom 510. The power control unit 500 adjusts throttling duty of the system chip according to a power management mode of the CPU 100 under the control of the micom 510 to thereby regulate the speed of the CPU 100.

Figure 6:
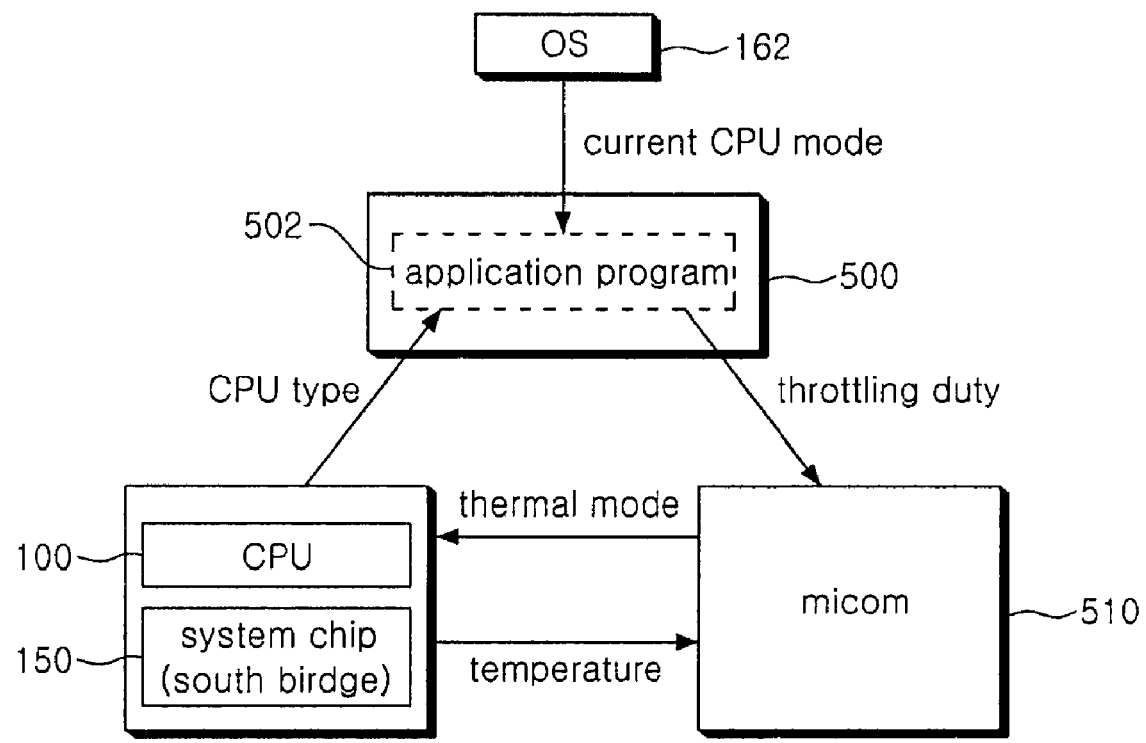
FIG. 6 is a block diagram for explaining in detail power control-related components included in the computer system shown in FIG. 5.

Referring to FIG. 6, a power-saving mode circuit includes components for providing a power-saving mode in cooperation with the micom 510. The power control mode 500 in FIG. 6 is a function block implemented by an application program 502. The program 502 for implementing the power control unit 500 is a program stored in the micom 510, and is operated by the micom 510. The application program 502 acquires information on whether a CPU power management mode is set to a power-saving mode from the operating system 162. When the CPU power management mode is set to the power-saving mode, the application program 502 notifies the micom 510 that is to continuously perform CPU throttling. In contrast with this, when the CPU power management mode is not set to the power-saving mode, the application program 502 notifies the micom 510 that it need not continuously perform the CPU throttling.

A thermal sensing circuit 102 for sensing system temperature is provided within the CPU 100 to measure the system temperature, and temperature data measured in this way is delivered to the micom 510. After receiving the information on the power-saving mode from the application program 502, the micom 510 converts the power-saving mode information into temperature. For each power management mode of the CPU 100, a thermal zone of a certain range in connection therewith is stored in the micom 510. For example, one thermal zone may be defined as a range of 10☐ to 20☐, and another thermal zone may be defined as a range of 21☐ to 30 ☐.

The application program 502 stored in the micom 510 determines the type of the CPU 100 in such a manner that the micom 510 determines whether the CPU 100 provides a power-saving function, such as a function of adjusting CPU speed according to CPU modes. When the CPU 100 is determined as a CPU not providing the function lowering CPU speed, the application program 502 receives information on a CPU power management mode from the operating system 162.

A user can select and specify the CPU power management mode through a user interface of the computer system. For example, when a user uses a notebook in a situation where he/she cannot connect the notebook to an AC power source, he/she can select a power-saving mode (for example, an optimal battery mode or a full battery mode) in order to prolong the use time of a battery.

If a user changes the current mode of the CPU 100, the application program 502 understands this change as an event of the OS 162. In general, the power management mode of the CPU 100 supports four modes of a full performance mode, an automatic mode, an optimal battery mode and a full battery mode. This classification of the power management mode is not absolute, but may vary with computer manufacturers.

In the optimal battery mode, the CPU operates at a speed equal to or less than half the full speed. The full battery mode may be selected when work requiring only CPU processes of the lowest level is being performed or when lowering of processing speed is tolerated for the sake of battery power saving. In the full battery mode, the CPU 100 operates at a speed equal to or less than half the full speed according to battery residual capacity.

The power management mode of the CPU 100 may be automatically managed through a power management program of the computer system or may be manually operates by a user. For example, the power management program of the computer system may be configured such that the computer is automatically switched to the power-saving mode when a reduction in battery power level is sensed.

When a user manually sets the power management mode, the user drives an OS control panel program installed in the computer system, and selects and specifies a specific power management mode on a power management applet menu provided by the control panel program or a BIOS setup menu. The application program 502 in the micom 510 then sets the power management mode selected and specified on the power management applet menu or the BIOS setup menu as the power management mode of the computer system. In this way, the power management mode of the computer system can be manually set to a specific power management mode.

Next, a description will be given for a case where the power management mode of the computer system is automatically set to a power management mode optimally suitable to the current system state.

If a user desires to set the power management mode not manually one by one in terms of hardware or software, but automatically, he/she can select and specify an auto-setting option for the power management mode on the power management applet menu and the BIOS setup menu.

In the power-saving mode, the micom 510 acquires information on the current system temperature from the operating system 162, and acquires information on the power-saving mode of the CPU 100. The micom 510 converts the power-saving mode information into temperature to compare the converted temperature with the current system temperature, and selects the higher temperature of the two temperatures. The throttling duty of the system chip (south bridge) is adjusted according to this temperature. If the throttling duty of the system chip is adjusted, the speed of the CPU 100 is regulated accordingly.

The CPU speed may be regulated stepwise by 12.5%. For example, assuming that the CPU speed is regulated in 5 steps, the CPU speed may be regulated to the full speed, 87.5% of the full speed, 75% of the full speed, 62.5% of the full speed and 50% of the full speed.

Figure 7:
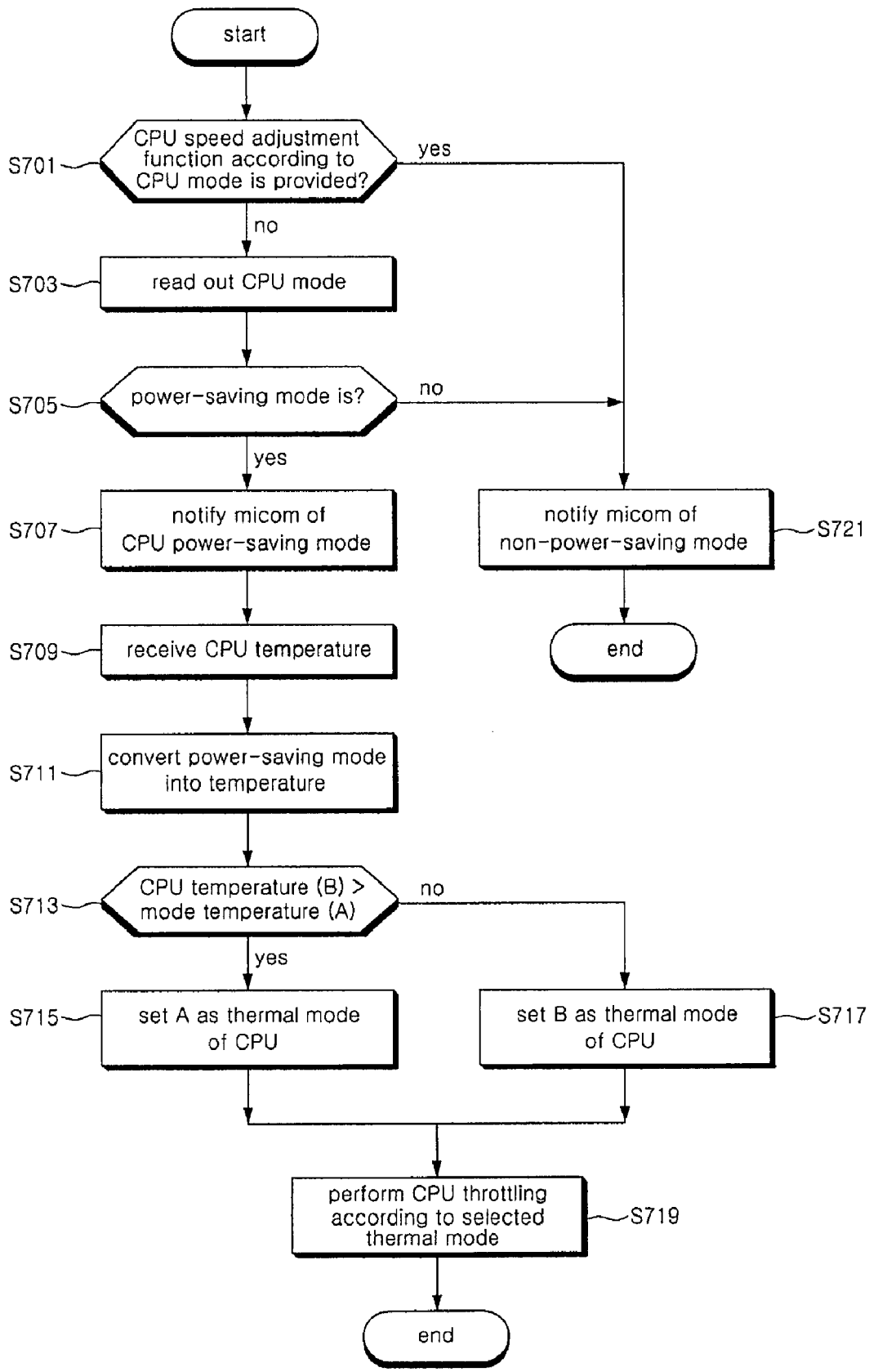
FIG. 7 is a step-by-step flowchart for explaining a method for implementing a power-saving mode in a computer system.

FIG. 7 illustrates a method for implementing a power-saving mode in a computer system. In the method for implementing a power-saving mode in a computer system, whether a CPU 100 has a function of adjusting CPU speed according to a power management mode is first determined (S701). If the CPU 100 provides a speed adjustment function, the micom 510 is notified that throttling is not necessary (S702). In this case, since throttling duty of the computer is maintained to 0%, the CPU can operate at the original speed.

However, when the CPU 100 of the computer system does not provide the CPU speed adjustment function, information on a power management mode of the CPU is acquired (S703). The information on a power management mode can be acquired from an operating system 162 of the computer system. The power management mode of the CPU 100 may be automatically changed or may be changed by the selection of a user.

Whether the CPU power management mode is set to a power-saving mode such as an optimal battery mode or a full battery mode is determined based on the acquired CPU power management mode information (S705), and the micom 510 is notified of the power-saving mode when the CPU power management mode is set to the power-saving mode (S707). As stated above, the micom 510 is also notified of non-power-saving mode when the CPU power management mode is not set to the power-saving mode.

When the CPU 100 of the computer system does not provide the speed adjustment function, and the CPU power management mode is set to the power-saving mode, the speed of CPU 100 is adjusted by performing throttling according to system temperature. Subsequently, concrete procedures of performing the throttling in each power-saving mode follow steps S709 to S719. In other words, steps S709 to 719 explain in detail a process of adjusting the throttling duty according to the CPU power management mode.

When the CPU power management mode is set to the power-saving mode, the micom 510 receives data on the current system temperature from the CPU (S709). In addition, the micom 510 acquires data on the CPU power management mode from the operating system, and converts the power management mode data into temperature (S711).

The micom 510 determines whether a value (A), obtained by converting the power-saving mode into temperature, is higher than the current system temperature (B) acquired in the preceding step (S713). If the value (A) is higher than the current system temperature (B), the value (A) obtained by converting the power-saving mode into temperature is set as a thermal mode of the system (S715), and the CPU throttling is performed accordingly (S719).

On the contrary, if the value (A) is not higher than the current system temperature (B), the current system temperature (B) is set as a thermal mode the system (S717), and the CPU throttling is performed accordingly (S719).

As described above, throttling duty of a system chip may be adjusted such that CPU speed decreases when a CPU power management mode is set to a power-saving mode. Through such a decrease in CPU speed, power consumption can be reduced. Therefore, battery use time of a portable computer may be prolonged.

In addition, a computer system with power-saving capability and a method for implementing a power-saving mode in a computer system enables a user to select a CPU power-saving mode and implement power-saving capability through lowering of CPU speed even in a low price computer not providing a function of reducing power consumption through a decrease in CPU speed.

Moreover, the power-saving capability has an advantage in that a noteworthy power-saving effect is provided only by modification of software without changes in hardware.

Although particular implementations have been described for illustrative purposes, those skilled in the art will appreciate that various modifications, additions and substitutions are possible, without departing from the scope and spirit of the claims. For example, a computer system with power-saving capability and a method for implementing a power-saving mode in a computer system can be applied to a desktop computer as well as a portable computer such as a notebook, and may also be applied to other types of portable information devices including a microprocessor.

What is claimed is:

1. A computer system comprising:
   an operating system;
   a CPU operatively connected with the operating system, the CPU having a thermal sensing circuit for sensing a current CPU temperature; and
   a microcomputer configured to adjust a throttling duty to regulate CPU speed according to a power management mode of the CPU, wherein the microcomputer is configured to acquire information on a current power management mode of the CPU from the operating system of the computer system, and, when the CPU power management mode is set to the power saving mode, to perform CPU throttling according to a higher one of a temperature between a value obtained by converting power-saving mode information into temperature and the current system temperature sensed by the thermal sensing circuit.

2. The computer system as claimed in claim 1, wherein the power management mode of the CPU includes at least one mode selected from the group consisting of a full performance mode, an optimal battery mode, a full battery mode and an automatic mode.

3. The computer system as claimed in claim 2, wherein the power saving mode includes at least one of the optimal battery mode and the full battery mode.

4. The computer system as claimed in claim 3, wherein the microcomputer adjusts the throttling duty to a predetermined value in the optimal battery mode.

5. The computer system as claimed in claim 3, wherein the microcomputer adjusts the throttling duty in proportion to a battery residual capacity in the full battery mode.

6. The computer system as claimed in claim 2, wherein the microcomputer adjusts the throttling duty to achieve a full CPU speed in the full performance mode.

7. The computer system as claimed in claim 2, wherein the microcomputer references a CPU occupancy rate and adjusts the throttling duty in relation to the CPU occupancy rate in the automatic mode.

8. A computer system comprising:
   an operating system;
   a CPU having a thermal sensing circuit for sensing a current CPU temperature; and
   a power management unit configured to adjust a throttling duty of the CPU to regulate CPU speed according to a CPU power management mode of the CPU, wherein the power management unit is configured to acquire information on a current power management mode of the CPU from the operating system of the computer system, and, when the power management mode is set to a power saving mode, to perform CPU throttling according to a higher one of a current temperature value sensed by the thermal sensing circuit and a temperature value obtained by converting power-saving mode information into a temperature value.

9. The computer system as claimed in claim 8, wherein the power management mode of the CPU includes at least one mode selected from the group consisting of a full performance mode, an optimal battery mode, a full battery mode and an automatic mode.

10. The computer system as claimed in claim 9, wherein the power saving mode includes at least one of the optimal battery mode and the full battery mode.

11. The computer system as claimed in claim 10, wherein the power management unit adjusts the throttling duty to a predetermined value in the optimal battery mode.

12. The computer system as claimed in claim 10, wherein the power management unit adjusts the throttling duty in proportion to a battery residual capacity in the full battery mode.

13. The computer system as claimed in claim 9, wherein the power management unit adjusts the throttling duty to achieve a full CPU speed in the full performance mode.

14. The computer system as claimed in claim 9, wherein the power management unit references a CPU occupancy rate and adjusts the throttling duty in relation to the CPU occupancy rate in the automatic mode.

15. A computer system comprising:
    an operating system;
    a CPU having a thermal sensing circuit for sensing a current CPU temperature; and
    a microcomputer configured to adjust a throttling duty to regulate CPU speed according to a power management mode of the CPU, for acquiring information on a current power-saving mode of the CPU from the operating system of the computer system, and for performing CPU throttling according to a higher one of a temperature value obtained by converting the power-saving mode information into a temperature value and the current sensed CPU temperature.

16. The computer system as claimed in claim 15, wherein the microcomputer performs the CPU throttling when the CPU power management mode is set to an optimal battery mode or a full battery mode.

17. A method for implementing a power-saving mode in a computer system, the method comprising:
    determining if a CPU has a CPU speed adjusting function;
    determining a CPU power management mode if the CPU does not have the CPU speed adjusting function; and
    adjusting the throttling duty of the CPU according to the determined CPU power management mode, the adjusting comprising:
      determining if the CPU power management mode is set to a power-saving mode;
      converting the power-saving mode into temperature when the CPU power management mode is set to the power-saving mode;
      measuring current CPU temperature when the power management mode is set to the power-saving mode; and
      performing CPU throttling according to a higher one of the power-saving mode converted to temperature and the measured CPU temperature.

18. The method as claimed in claim 17, wherein the power management mode of the CPU includes at least one mode selected from the group selected from the group consisting of a full performance mode, an optimal battery mode, a full battery mode and an automatic mode.

19. The method as claimed in claim 18, wherein, in the adjusting, the throttling duty of the CPU is adjusted to 0% when the CPU power management mode is set to the full performance mode.

20. The method as claimed in claim 18, wherein, in the adjusting, the throttling duty of the CPU is adjusted to a single value when the CPU power management mode is set to the optimal battery mode.

21. The method as claimed in claim 18, wherein, in the adjusting, the throttling duty of the CPU is adjusted in proportion to a battery residual capacity when the CPU power management mode is set to the full battery mode.

22. The method as claimed in claim 18, wherein, in the adjusting, the throttling duty of the CPU is adjusted according to a CPU occupancy rate such that the CPU operates at a speed proportional to a load imposed on the computer system.

23. The method as claimed in claim 18, wherein the CPU power management mode is determined as the power-saving mode when the CPU power management is set to the full battery mode or the optimal battery mode.

24. A method for implementing a power-saving mode in a computer system, the method comprising:
  determining if a CPU has a CPU speed adjusting function;
  determining a CPU power management mode including at least one mode selected from the group consisting of a full performance mode, and optimal battery mode, a full battery mode and an automatic mode if the CPU does not have the CPU speed adjusting function;
  adjusting the throttling duty of the CPU to 0% when the CPU power management mode is set to the full performance mode, to a single value when the CPU power management mode is set to the optimal battery mode, in proportion to a battery residual capacity when the CPU power management mode is set to the full battery mode, and according to a CPU occupancy rate such that the CPU operates at a speed proportional to a load imposed on the computer system when the CPU power management mode is set to the automatic mode;
  determining if the CPU power management mode is set to the power-saving mode including one of the full battery mode and the optimal battery mode;
  converting the power-saving mode into temperature when the CPU power management mode is set to the power-saving mode;
  measuring current system temperature when the CPU power management mode is set to the power-saving mode; and
  performing CPU throttling according to a higher one of a temperature obtained by converting the power-saving mode of the CPU into temperature and the measured current system temperature.

* * * * *

UNITED STATES PATENT AND TRADEMARK OFFICE
CERTIFICATE OF CORRECTION

PATENT NO.      : 7,594,132 B2                                    Page 1 of 1
APPLICATION NO. : 11/382873
DATED           : September 22, 2009
INVENTOR(S)     : Yang Hoon Kim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 543 days.

Signed and Sealed this

Twenty-eighth Day of September, 2010

David J. Kappos
*Director of the United States Patent and Trademark Office*